A. DANISON.
CORN POPPER.
APPLICATION FILED OCT. 25, 1909.

971,255.

Patented Sept. 27, 1910.

2 SHEETS—SHEET 1.

Witnesses
W. A. Loftus.
A. G. Hague.

Inventor.
Arthur Danison
by Craig & Laub Attys

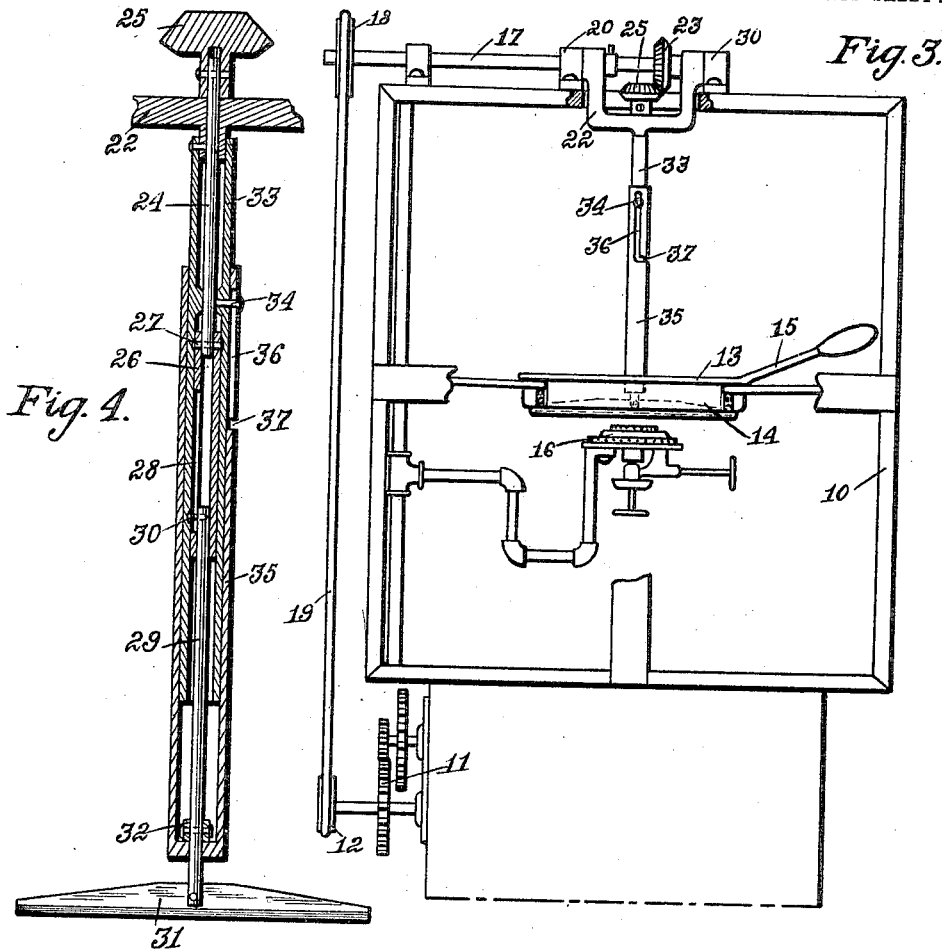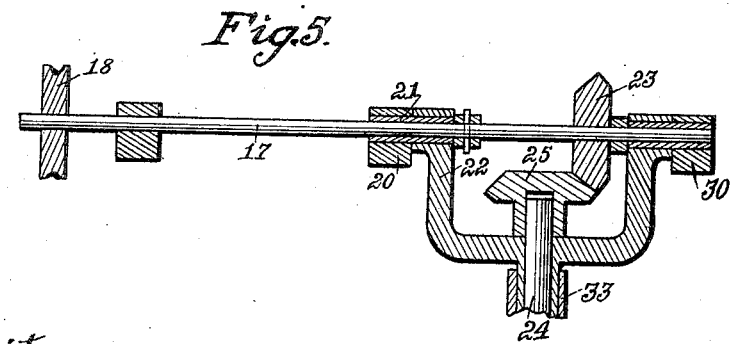

UNITED STATES PATENT OFFICE.

ARTHUR DANISON, OF BLUE EARTH, MINNESOTA.

CORN-POPPER.

971,255. Specification of Letters Patent. Patented Sept. 27, 1910.

Application filed October 25, 1909. Serial No. 524,393.

*To all whom it may concern:*

Be it known that I, ARTHUR DANISON, a citizen of the United States, residing at Blue Earth, in the county of Faribault and State of Minnesota, have invented a certain new and useful Corn-Popper, of which the following is a specification.

The object of my invention is to provide a corn popping machine of simple, durable, and inexpensive construction, of the kind in which the stirring member is actuated by power such, for instance, as a spring motor.

More specifically, it is my object to provide a device of this kind in which the stirring member may be operated with a minimum of applied power and without excessive loss by friction, so that a comparatively small spring motor may be used in operating it.

A further object is to provide a device of this kind in which the operator may readily and easily grasp the stirring member and elevate it out of the pan and move it to one side so that the pan may be removed and the contents thereof discharged without the necessity of stopping the spring motor so that the pan may be returned and the stirring member again placed in position without loss of time.

A further object is to provide improved means for holding the stirring member in an elevated position at one side of the pan so that the movement of the pan will not be interfered with by the said stirring member.

My invention consists in the construction, arrangement, and combination of the various parts of the device, whereby the objects contemplated are attained, as hereinafter more fully set forth, pointed out in my claims, and illustrated in the accompanying drawings, in which—

Figure 1:
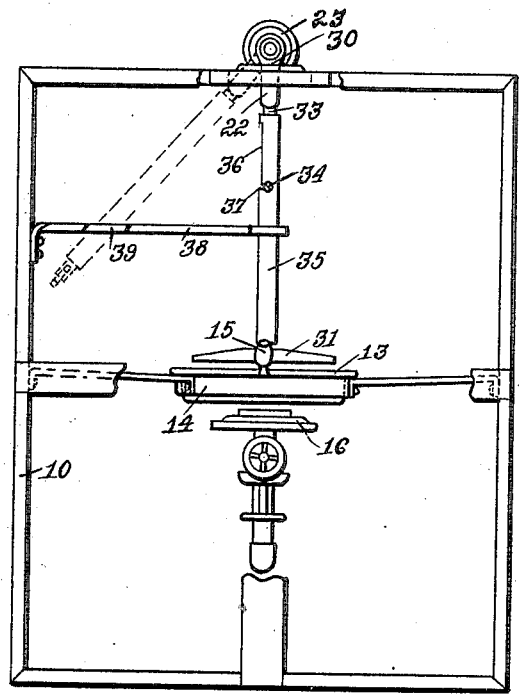
Figure 2:
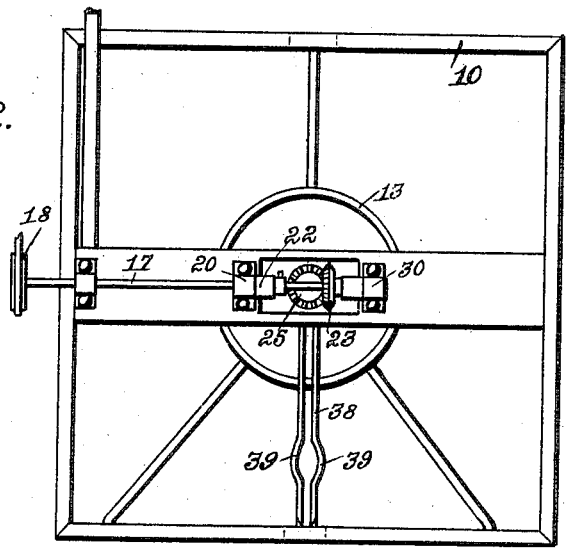

Figure 1 shows a side elevation of a device embodying my invention. The dotted lines in said figure show the stirring member in an elevated position. Fig. 2 shows a top or plan view of same. Fig. 3 shows a view similar to Fig. 1 taken from an opposite side. Said view also shows an operating device consisting of a spring motor connected with the power shaft of the stirring member. Fig. 4 shows an enlarged, detail, sectional view illustrating the stirring member and its operating mechanism, and— Fig. 5 shows an enlarged, detail, sectional view illustrating the power shaft and the means for connecting the stirring member with it.

Referring to the accompanying drawings, I have used the reference numeral 10 to indicate the machine frame. This is preferably provided with a spring motor which is not herein fully illustrated and described. The numeral 11 is used to indicate a train of gears connected with it and the numeral 12 indicates a pulley connected with the train of gears. At about the central portion of the frame 10 is a circular support 13 for a pan, the pan being indicated by the numeral 14. Said pan is provided with a handle 15 so that it may be readily and easily removed from the support or placed therein. Below the pan is a burner 16 for gasolene or other material.

The improved stirring mechanism which constitutes the essential feature of my invention, comprises a power shaft 17 mounted on top of the main frame and provided with a pulley 18 connected by a belt 19 with the pulley 12. The power shaft 17 is extended through two stationary bearings 20. Each of these bearings is provided with a sleeve 21 encircling the shaft 17, each sleeve being extended beyond the bearing 20.

I have provided a forked hanger 22 for supporting the stirring member, which forked hanger has its ends mounted on the sleeves 21 so that the hanger may freely swing relative to the power shaft and so that the rotation of the power shaft will not tend to swing the hanger.

Fixed to the power shaft 17 is a beveled pinion 23. Extended through the hanger 22 is a shaft section 24 having a beveled pinion 25 fixed to its upper end and in mesh with the beveled pinion 23. This shaft section 24 has its lower end inserted in a tube 26 and held therein by the rivet 27. This sleeve is provided with a longitudinal slot at 28, and mounted in the lower end of the sleeve is a short shaft section 29 having a pin 30 therein extended through the slot 28 so that the shaft sections 24 and 29 are connected in such a manner that they will rotate in unison and the lower shaft section 29 may freely move upwardly throughout the length of the slot 28. On the lower end of the shaft section 29 is a stirring cross piece 31 designed to enter the pan 14 and to agitate the contents thereof when the stirring cross piece is rotated. Fixed to the shaft section 29 above its lower end is a block 32 for purposes hereinafter made clear.

By the arrangement just described, it is obvious that when the power shaft 17 is rotated, the stirring cross piece 31 will be rotated in unison with it. It, obviously, would be impracticable for an operator to grasp the rotatable portions of the shaft while they were turning in order to elevate the stirring member out of the pan, and in order to provide convenient and easy means for moving the stirring member, I employ the following devices: Fixed to the lower end of the hanger 22 is a sleeve 33 having a pin 34 extending outwardly from its lower end. Slidingly mounted upon this sleeve 33 is another sleeve 35 having an opening in its lower end through which the shaft section 29 is extended and also having a vertical slot 36 at its upper end having a horizontal extension 37 at its lower end. The said supporting block 32 is so arranged that when the sleeve 35 is elevated, it will elevate the shaft 29.

By the arrangement just described, it is obvious that the shaft to which the stirring cross piece is attached may freely rotate without turning the sleeves 33 and 35, and the operator may readily and easily grasp the sleeve 35 and elevate it until the pin 34 enters the horizontal slot 37, and then, by turning the sleeve 35 a part revolution, the said sleeve together with the stirring cross piece may be held in an elevated position, and this can be done without stopping the rotation of the stirring member so that the operator may readily and easily remove the pan and replace it and then lower the stirring member into position without loss of time such as would be required if it were necessary to stop and start the stirring member. Furthermore, the entire stirring device may, if desired, be swung to one side so that it will be out of the way of the operator in removing or replacing the pan.

In the event that it is desired to permanently support the stirring member at one side of the pan, I have provided two spring metal bars 38 having outwardly bowed portions at 39. These parts are arranged so that the stirring member may be swung laterally between them and, when the stirring member reaches the bowed portions 39, it will be permanently held therein until the stirring member is grasped by the operator and pulled to position over the pan. In practice, I have found that it is not necessary to move the stirring member to position in the support except at such times as the power is shut off.

In practical use, it is obvious that by means of the construction disclosed, the stirring member may be operated with a minimum of applied power such as can be furnished with a spring motor. The operator can grasp the sleeve 35, raise and lower the stirring cross piece quickly and easily, and thus control its operation relative to the material within the pan. Any time that it should be necessary to remove the pan, the operator can, with one hand, grasp the sleeve 35 and raise it and swing it slightly to one side so that he can, with the other hand, grasp the handle of the pan and remove it and discharge its contents. Then when the operator releases the sleeve 35, the stirring member will immediately assume the position directly over the center of the pan and will continue to rotate. Furthermore, it is obvious that on account of the sleeves 21, the rotation of the power shaft 17 will not tend to turn the hanger 22 on its bearing, and hence the stirring member will not be disturbed in its position over the center of the pan.

I claim as my invention:

1. A device of the class described, comprising a pan-supporting means, a power shaft above it, a hanger on the power shaft, a shaft section, a second shaft section slidingly connected with the first, a stirring cross piece attached to the second shaft section, and means for raising and lowering the lower shaft section and for supporting it in either position of its adjustment.

2. A device of the class described, comprising a pan-supporting means, a power shaft above it, a hanger on the power shaft, a shaft section, a second shaft section slidingly connected with the first, a stirring cross piece attached to the second shaft section, and means for raising and lowering the lower shaft section and for supporting it in either position of its adjustment, said means comprising a sleeve fixed to the hanger and encircling said shaft sections, a second sleeve slidingly mounted on the first, means connected with the lower shaft section and the latter sleeve whereby an elevation of the latter sleeve will raise the lower shaft section, and means for supporting the latter sleeve in an elevated position.

3. A device of the class described, comprising a pan support, a power shaft, a hanger on the power shaft, a shaft section rotatably mounted in the hanger, a gearing device connecting the power shaft and the shaft section, a tube fixed to the lower end of said shaft section and having a vertical slot, a second shaft section, a stirring cross piece fixed to the lower end thereof, a pin fixed to the upper end thereof and mounted in said slot, a bearing block fixed to the lower end portion of the latter shaft section, a sleeve fixed to the hanger and having a pin, a second sleeve slidingly mounted on the first and having a vertical slot with a lateral extension therein to receive said pin, and also having a lower end through which the lower shaft section is extended, said lower end being designed to engage said bearing block, substantially as and for the purposes stated.

4. A device of the class described, comprising a pan support, a horizontally arranged power shaft, two bearings thereon, a sleeve fixed to each bearing to encircle the power shaft and extended beyond the bearing, a hanger rotatably mounted on said sleeves, a stirring shaft rotatably mounted in the hanger, beveled gear wheels in mesh with each other and fixed to said shafts, and a stirring cross piece operatively connected with the shaft in the hanger, said parts being so arranged that the rotation of the power shaft will not affect the swinging movements of the hanger.

5. In a device of the class described, the combination of a frame, a pan support therein, a power shaft at the top of the frame, a hanger thereon, a rotatable shaft mounted in the hanger, a stirring cross piece connected therewith, gearing devices connecting the power shaft and the shaft in the hanger, and two spring bars spaced apart from each other to receive the shaft of the stirrer and having outwardly bowed portions therein to hold the stirrer shaft in position inclined away from the said pan support, for the purposes stated.

Des Moines, Iowa, Sept. 7, 1909.

ARTHUR DANISON.

Witnesses:
　CHAS. ALING,
　JOS. K. LOCKREM.